June 23, 1970   O. E. JOHNSON   3,516,499
FLEXIBLE TANDEM IMPLEMENT
Original Filed Feb. 6, 1967   5 Sheets-Sheet 5
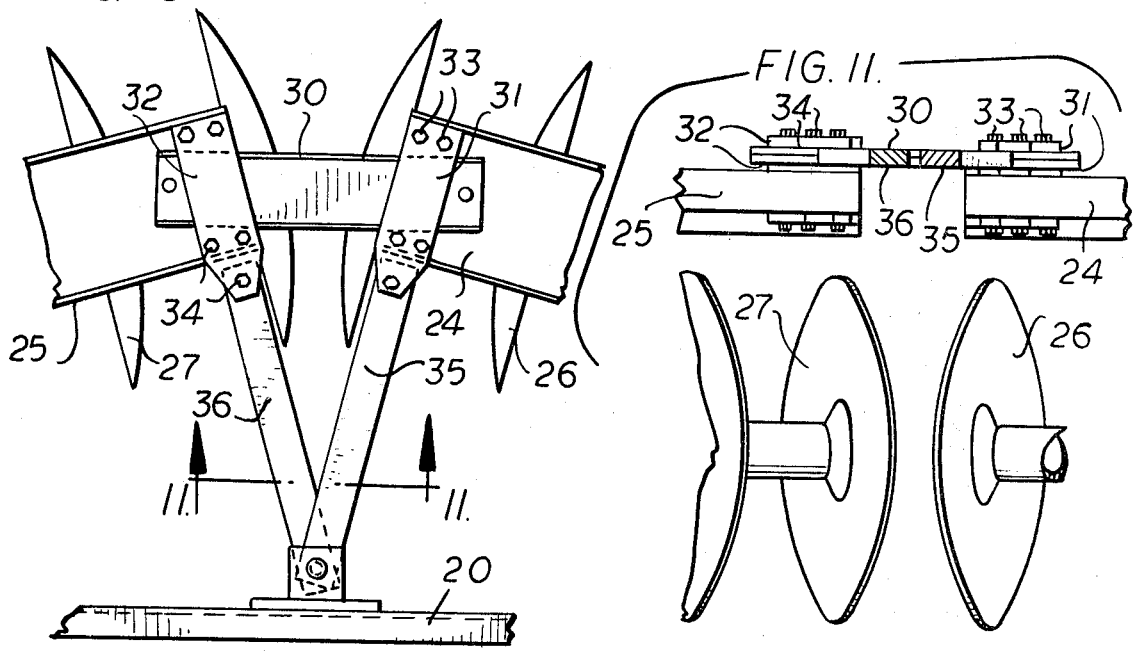
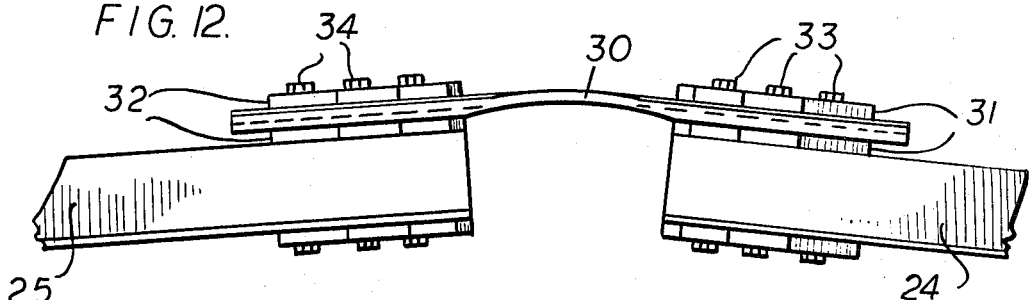
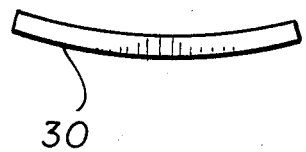
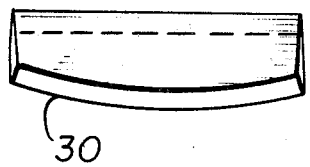
INVENTOR
OTTO E. JOHNSON
ATTY

United States Patent Office 3,516,499
Patented June 23, 1970

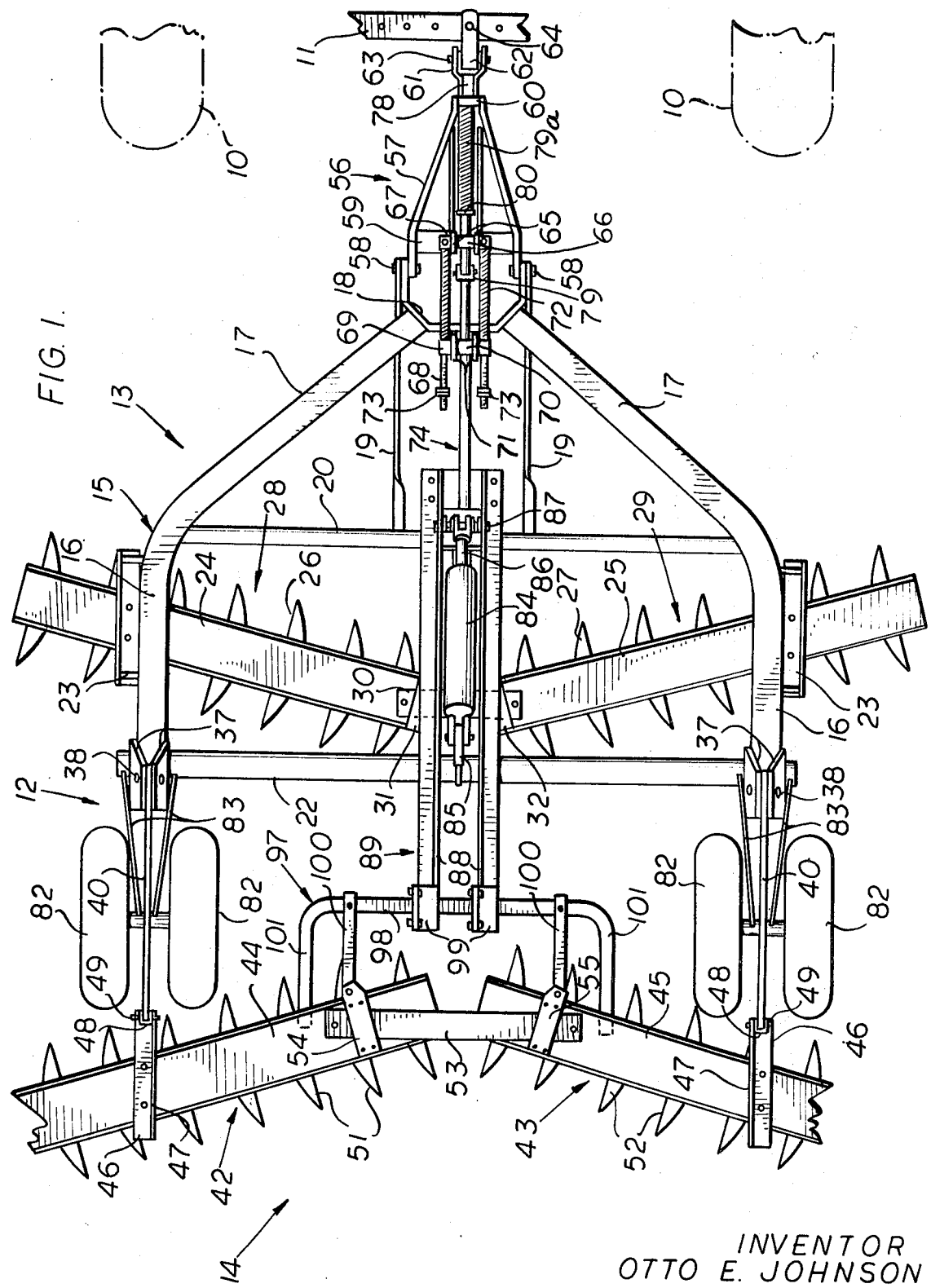

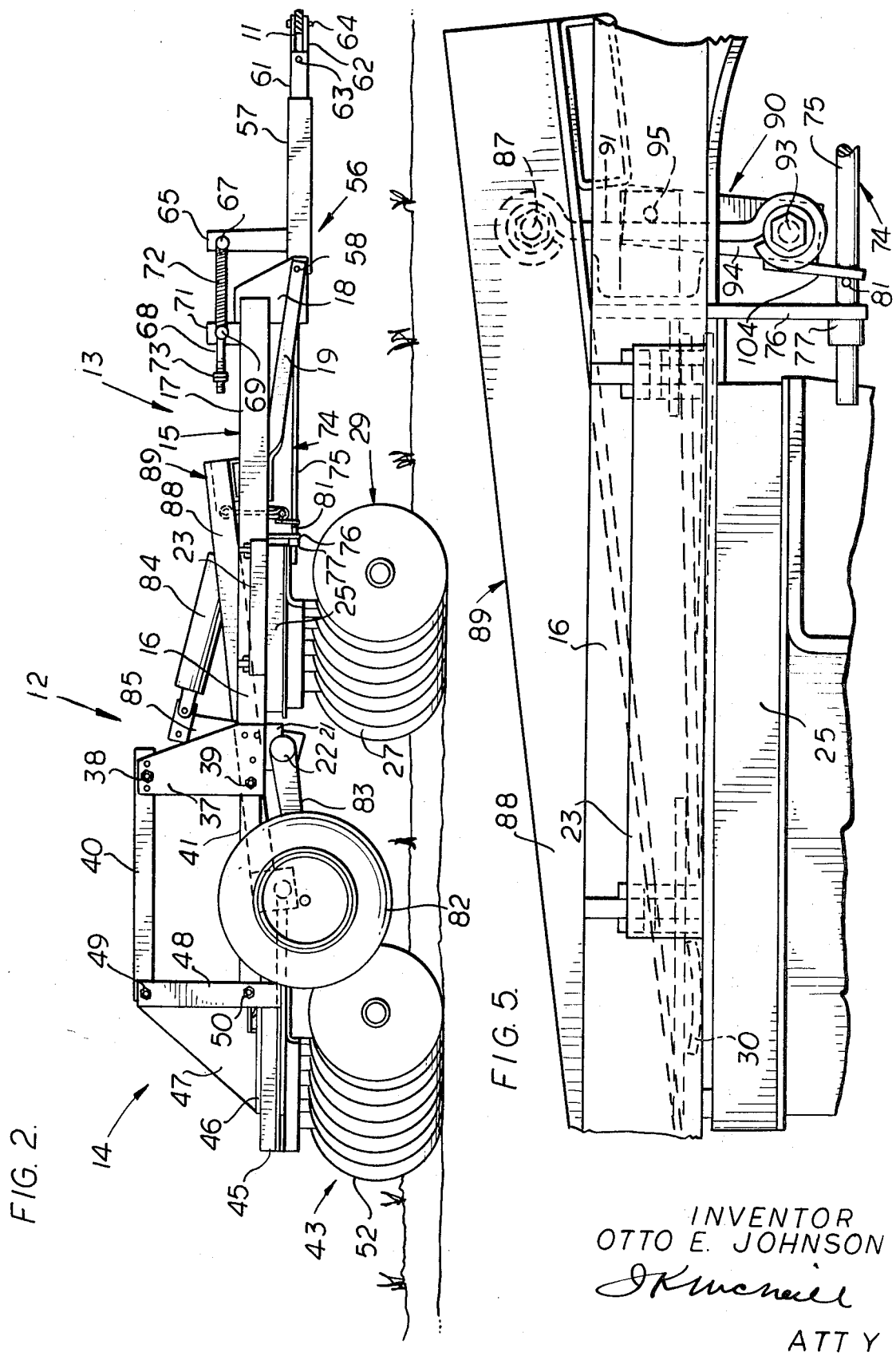

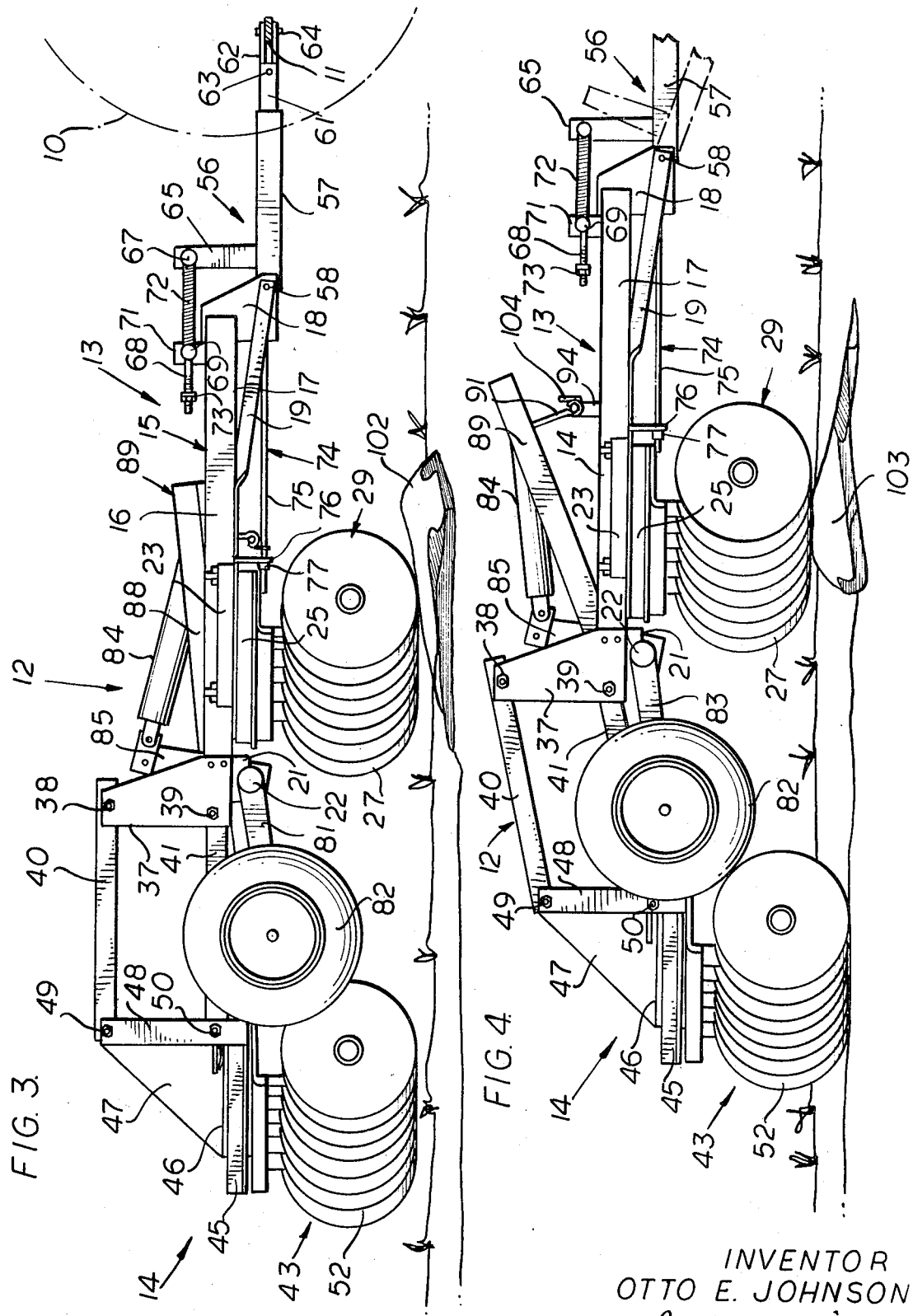

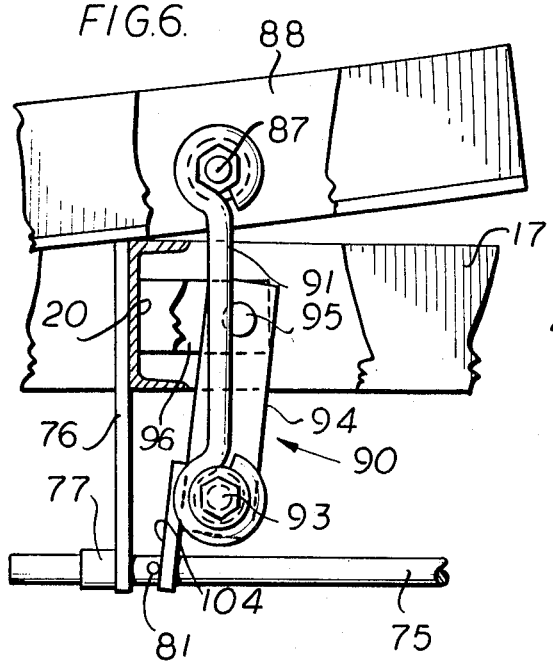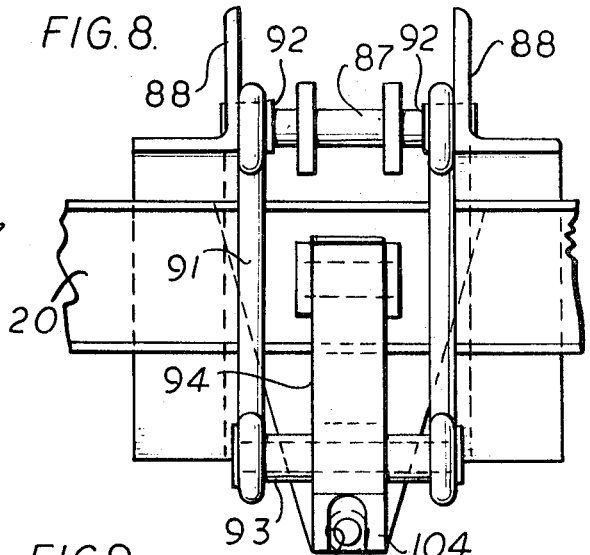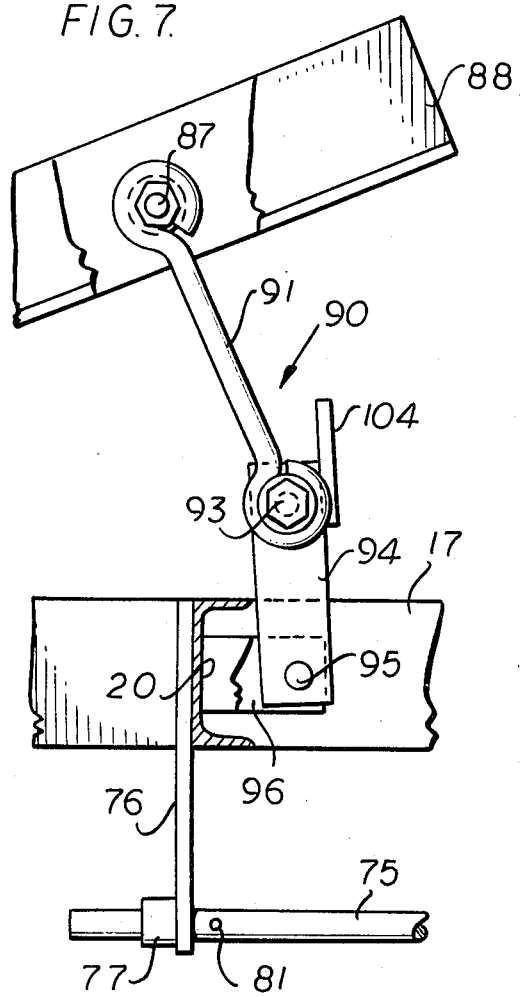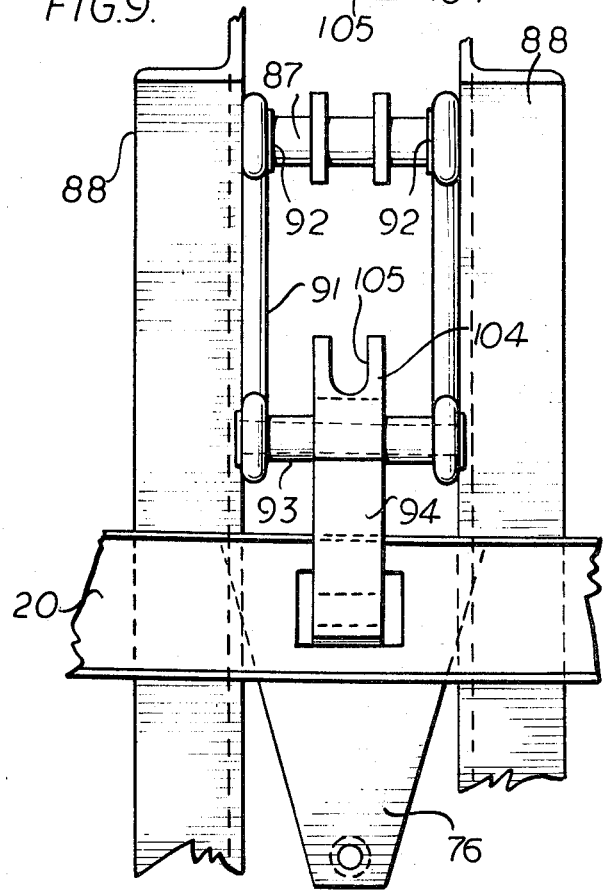

---

3,516,499
FLEXIBLE TANDEM IMPLEMENT
Otto E. Johnson, Hinsdale, Ill., assignor to International Harvester Company, Chicago, Ill., a corporation of Delaware
Continuation of application Ser. No. 614,127, Feb. 6, 1967. This application Oct. 20, 1969, Ser. No. 867,957
Int. Cl. A01b 61/00
U.S. Cl. 172—261
17 Claims

ABSTRACT OF THE DISCLOSURE

A flexible tractor-drawn implement such as a tandem disk harrow wherein the front operating unit is connected to the rear unit by means accommodating relative vertical movement between the units while supporting the weight of the rear unit on the front unit when the latter is elevated by engaging an obstruction offering a low draft resistance. The implement is connected to the tractor by a slidable draft member which releases the supporting means for the rear unit when the front unit rides over an obstacle offering abnormal draft resistance.

---

This is a continuation of application Ser. No. 614,127, filed Feb. 6, 1967, and now abandoned.

This invention relates to agricultural implements and particularly to implements of the trail-behind type. More specifically, the invention concerns an implement comprising tandem operating units, such as a tandem disk harrow.

An object of the invention is the provision of a tandem implement of improved flexibility.

Another object of the invention is the provision of a novel flexible implement such as a disk harrow having tandem operating units connected by means accommodating relative vertical floating movement between the front and rear units, and wherein the rear unit is supported by and adds its weight to the front unit when the front unit rises with reference to a datum line.

Another object of the invention is the provision of an improved implement having tandem units connected for relative vertical movement between front and rear units and wherein the rear unit is supported by the front unit when the latter is lifted by engaging an obstacle during operation imposing low draft resistance, and wherein lowering of the rear unit relative to the front unit occurs when the latter is lifted by engaging an obstacle imposing a relatively high draft resistance.

Another object of the invention is the provision of an improver flexible disk harrow wherein transversely aligned gangs of disks are connected by a concave leaf spring providing adequate rigidity between the gangs when both gangs are lifted but accommodating relative vertical movement between the gangs during operation to allow them to follow variations in ground contour.

Other objects and advantages of the invention will become clear from the following detailed description when read in conjunction with the accompanying drawings wherein:

FIG. 1 is a plan view of a tandem disk harrow incorporating the features of this invention connected in trailing relation to the drawbar of a tractor of any well known type having means thereon for supplyin~ fluid under pressure;

FIG. 2 is a view in side elevation of the implement shown in FIG. 1 illustrating the position of the parts during normal operation of the implement;

FIG. 3 is a view in side elevation similar to FIG. 2 showing the relationship of the implement parts when the front unit of the tandem disk horrow of this invention rides over a sloping obstruction offering low draft resistance to the implement;

FIG. 4 is a view similar to FIGS. 2 and 3 showing the relationship of parts when the front unit of the harrow rides over an obstacle offering high draft resistance;

FIG. 5 is an enlarged detail of a portion of the structure shown in FIG. 2;

FIG. 6 is a sectional detail with parts broken away of the toggle linkage controlling the vertical movement of the rear implement unit relative to the front unit;

FIG. 7 is a view similar to FIG. 6 showing the position of the parts when the toggle is released;

FIG. 8 is a front view of the structure shown in FIG. 6;

FIG. 9 is a front view of the structure shown in FIG. 7;

FIG. 10 is an enlarged detail of a portion of the structure shown in FIG. 1, illustrating the connection between the inner ends of laterally spaced disk gangs;

FIG. 11 is a section taken on the line 11—11 of FIG. 10;

FIG. 12 is a detail in elevation of the connecting means between adjacent gangs of disks illustrating the flexibility of the connecting means during operation of the implement to permit the gangs to follow ground contour;

FIG. 13 is an end view of the concave leaf spring shown in FIG. 11; and

FIG. 14 is an end view of the spring as shown in FIG. 12.

The implement shown in the drawings is a wheel controlled, tandem disk harrow, although it may be understood that the invention is not limited to disk harrows but is also applicable to other tandem implements. The implement is attached to a tractor having rear drive wheels 10 and a drawbar 11. The implement supporting frame, generally designated by the numeral 12, carries front and rear operating units 13 and 14, respectively, the front unit including a main frame section 15 having side bars 16 the forward portions 17 of which converge and are secured to a U-shaped hitch plate 18.

Hitch plate 18 is connected by straps 19 to a transverse brace 20 connected between side bars 16, upon the rear ends of which are mounted depending plates 21 in which is rockably mounted a transverse shaft 22. Brackets 23 are secured to side bars 16 and support the outer portions of left- and right-hand beams 24 and 25. Oppositely facing left- and right-hand disks 26 and 27 of front unit 13 are mounted on the beams 24 and 25 and form therewith left- and right-hand front earth-working sub-units in the form of disk gangs 28 and 29 respectively.

The inner ends of beams 24 and 25 are flexibly connected by a concave leaf spring 30 the inner ends of which are anchored between pairs of plates 31 and 32 affixed to beams 24 and 25 by bolts 33 and 34, respectively. Draft links 35 and 36 connect the inner ends of beams 24 and 25 to brace 20 by pivot means accommodating vertical movement of the inner ends of the beams. While the concave shape of spring 30 is adequate to restrain vertical movement of the inner ends of the gang under normal operating conditions and in transport, the spring is capable of flexing during operation, as indicated in FIG 12 to permit disk gangs 28 and 29 to follow variations in ground contour.

A standard 37 comprising laterally spaced plates is affixed to and projects upwardly from the rear end of each side bar 16 and each standard has pivotally connected thereto at 38 and 39 the forward ends of vertically spaced generally parallel links 40 and 41, respectively.

The lateral spaced pairs of links 40 and 41 serve to support rear unit 14 comprising left- and right-hand disk gangs 42 and 43, which converge forwardly as opposed to the rearward convergence of front gangs 28 and 29. These gangs comprise horizontal beams 44 and 45, each of which is secured near its outer end by means accommodating pivoting of the beams in vertical planes, to brackets 46, each of which is provided with an upstanding triangular flange 47 to the forward edge of which is secured a channel member 48 to which the rear ends of links 40 and 41 are pivotally connected at 49 and 50.

Forwardly and inwardly facing disks 51 and 52 are mounted in well known manner on beams 44 and 45, and the inner ends of the beams are flexibly connected by a concave spring 53 considerably longer than spring 30 and having its ends anchored by clamping plates 54 and 55 to the inner ends of beams 44 and 45, respectively.

It should now be clear that rear unit 14 is capable of vertical floating movement about the axes of pivot pins 38 and 39 with respect to front unit 13. The implemetn is of the trail-behind type, and hitch means designated by the numeral 56 includes a yoke 57 pivotally connected to hitch plate 18 by pivot pins 58. Yoke 57 comprises spaced elements forwardly converging, connected near their rear ends by a brace 59 and at their forward ends by a plate 60. A clevis 61 comprising laterally spaced elements engageable at their rear ends with plate 60 forms part of the draft connection between the tractor and the implement, as will be hereinafter set forth, and is connected to a coupling 62 by a pivot pin 63. Coupling 62 is connected by a pin 64 to drawbar 11 of the tractor. The implement is thus capable of vertical floating movement about the axis of pin 63 and lateral swinging about pin 64.

The implement is also capable of pivoting relative to yoke 57 about a transverse axis represented by pins 58 to maintain the implement level in elevated positions relative to drawbar 11, and this action is controlled and cushioned by means including a pair of uprights 65 secured to brace 59 having a swivel 66 mounted between the upper ends thereof. Pins projecting from the ends of swivel 66 through uprights 65 have secured thereto blocks 67 each of which anchors one end of a rod 68, the other end of which is slidably receivable in an opening in a block 69 carried by the ends of a swivel 70 mounted between the upper ends of a pair of lugs 71. affixed to hitch plate 18. A spring 72 surrounds each of the rods 68 between uprights 65 and lugs 71 and is compressed therebetween in the normal operation of the implement. The degree of pivoting of the implement relative to yoke 57 is limited by the provision of a nut 73 engageable with block 69.

When pivot 58 moves vertically relative to tractor drawbar 11, the yoke 57 swings about pivot 58, for example to the dotted line position indicated in FIG. 4, to maintain the implement level.

Draft is transmitted from the tractor to the implement in a manner hereinafter set forth through a draft member 74 comprising a rear rod section 75 slidably receivable in an opening provided in a lug 76 secured to the implement frame and a sleeve 77 affixed to the lug.

Draft member 74 has a forward rod portion 78 having a universal pivotal connection at 79 with the forward end of rod section 75, substantially in alignment with pivots 58, rod section 78 being slidably received in an opening in plate 60 and is welded to clevis 61. Draft is taken through a spring 79a surrounding rod section 78 and abutting plate 60 at one end and a collar 80 affixed to the rod. Under normal operating conditions spring 79a abutting plate 60 of hitch yoke 57 absorbs the draft load so that no relative sliding movement occurs between draft member 74 and the implement. A pin 81 carried by rear rod section 75 near its rear end adjacent lug 76 serves a purpose hereinafter to be described.

Laterally spaced pairs of wheels 82 add their weight to the implement in operation and support the implement for transport. Each pair of wheels is secured to the rearwardly extending end of an arm 83 comprising laterally spaced elements affixed at their forward ends to rockshaft 22. The rocking of shaft 22 to vertically swing wheels 82 for raising and lowering the implement is accomplished by the provision of a hydraulic cylidner 84 pivotally connected to an arm 85 affixed to shaft 22 and having a piston rod 86 slidable therein pivotally connected to a pin 87 carried between a pair of angle bars 88 pivotally mounted on shaft 22 and forming part of an auxiliary frame 89, the cylinder 84 receiving fluid under pressure in well known manner from the source on the tractor and under control of the operator.

Auxiliary frame 89 is releasably locked to transverse brace 20 by toggle linkage 90 including a pair of upper link elements 91, each of which is pivotally mounted upon a boss 92 secured to angle bar 88 and rotatably receiving the pin 87. The lower ends of links 91 are pivotally mounted at the ends of a pin 93 upon which is centrally mounted another link 94, the other end of which is mounted on a pin 95 carried by a lug 96 secured to brace 20.

In the normal operating position of the implement, as shown in FIG. 2, auxiliary frame 89 is generally horizontal and toggle linkage 90 is in the overcenter locked position holding the auxiliary frame rigid with respect to main frame 15. In this position the front and rear units 13 and 14 are capable of independent vertical movement. Forming part of the auxiliary frame 89 is a U-shaped member 97 having a transverse portion 98 affixed to the rear ends of angle bars 88 by clamps 99, and draft is transmitted to the inner ends of rear gangs 42 and 43 by straps 100 pivotally mounted on the transverse portion 98 of member 97 and having their rear ends pivotally connected to clamping plates 54 and 55.

The rearwardly directed arms 101 of U-shaped member 97 extend rearwardly below beams 44 and 45, and limit downward movement of the rear unit 14 relative to front unit 13.

When the front unit encounters a sloping obstruction of the type show at 102 in FIG. 3, tending to raise the front unit above its normal level of operation, arms 101 of U-shaped member 97 engage beams 44 and 45 and support the weight of the rear unit upon the front unit until the obstacle is passed and the implement returns to normal operation. After the front unit has passed the obstacle shown in FIG. 3, the engagement of the rear unit with such an obstacle causes it to rise relative to the front unit about the pivot axes 38 and 39 of parallel links 40 and 41.

Should the implement engage a more abrupt obstacle, as shown at 103 in FIG. 4, an abnormal draft condition occurs which compresses spring 79a on hitch member 74 causing relative motion between rod section 75 and lug 76. Pin 81 in rod 75 engages a block 104 secured to link 94 and having a notch 105 therein to straddle rod section 75. Continued forward movement of rod section 75 and engagement of pin 81 with block 104 trips the toggle, allowing the rear end of auxiliary frame 89 to swing downwardly about the pivot thereof on the shaft 22 with the weight of rear unit 14, allowing the latter to move downwardly relative to the front unit 13 to maintain the disk gangs 42 and 43 in normal operation until the front gangs pass the obstacle. Upon return of the implement to the normal level operation of FIG. 2, toggle 90 returns to the overcenter locked position shown in detail in FIGS. 6 and 7.

It is believed that the construction and operation of the novel flexible tandem implement of this invention will be clearly understood from the foregoing description. It should likewise be understood that the invention has been described in its preferred embodiment and that modifications may be made therein without departing from the spirit of the invention.

What is claimed is:

1. In an implement adapted for connection to a tractor in draft-receiving relation including a supporting frame having front and rear tool carrying units mounted thereon in tandem, connecting means between said units effective to cause the entire implement to rise as a result of encountering an obstacle imposing low draft resistance to the progress of the implement, said connecting means including means responsive to abnormal draft forces encountered by the front unit accommodating upward movement of said front unit relative to the rear unit and means accommodating upward movement of the rear unit relative to the front unit when an obstruction is encountered directing a force upwardly against said rear unit comprising, vertically spaced generally parallel links extending between said units allowing relative vertical movement therebetween and means carried by the front unit operatively engageable with said rear unit to limit its downward movement relative to the front unit.

2. The invention set forth in claim 1, wherein each of said front and rear units comprises laterally spaced sub-units and flexible means connect the inner ends of said sub-units accommodating vertical movement of one sub-unit relative to the other sub-unit in response to an abnormal vertical force directed against one of said sub-units, said flexible means being relatively rigid during normal operation of the implement to maintain said sub-units in the same substantially horizontal plane.

3. The invention set forth in claim 2, wherein said flexible means in a horizontal concave leaf spring normally sufficiently rigid to hold said sub-units in said horziontal plane but flexible to allow said sub-units to conform to ground irregularities during operation.

4. In an implement adapted for connection to a tractor in draft-receiving relation including a supporting frame having front and rear tool carrying units mounted thereon in tandem, connecting means between said units effective to cause the entire implement to rise when the front unit rises as a result of encountering an obstacle imposing low draft resistance to the progress of the implement, said connecting means including a longitudinally extending member pivotally mounted medially of its ends on said supporting frame having its rear end operatively associated with said rear unit to prevent downward movement thereof when the front unit rises under normal draft conditions of the implement, and releasable means securing the forward end of said longitudinally extending member to the frame, said releasable means being releasable when the front unit encounters abnormal draft conditions to permit said member to swing about its pivot on the frame and accommodate lowering of the rear unit.

5. The invention set forth in claim 4, wherein said supporting frame includes a transverse wheel-carrying axle disposed between said units and said longitudinally extending member is pivotally mounted on said axle.

6. The invention set forth in claim 5, wherein said releasable means comprises toggle linkage connected between the frame and the forward end of said longitudinally extending member, said toggle linkage being locked under normal draft conditions of the implement to hold said member in a generally horizontal position and releasable when said front unit encounters abnormal draft conditions to permit the forward end of said member to swing upwardly about its pivot on said axle.

7. The invention set forth in claim 6, wherein a draft bar is operatively connected between the tractor and said toggle linkage and is effective when said front unit encounters abnormal draft conditions to release said toggle linkage.

8. In an implement adapted for connection to a tractor in draft-receiving relation including front and rear tool-carrying units in tandem, a main frame on which said front unit is mounted, connecting means extending between said front and rear units accommodating relative vertical floating movement of said units, and auxiliary frame means movably mounted on said main frame and extending rearwardly therefrom to limit the downward movement of the rear unit and support the weight thereof on the front unit when the latter encounters an obstruction causing the front unit to rise with reference to a datum line, said auxiliary frame means being movable out of supporting relation to said rear unit in response to a predetermined draft load on the implement to accommodate downward movement of the rear unit relative to the front unit.

9. The invention set forth in claim 8, wherein said auxiliary frame is pivotally mounted on the main frame for tilting about a transverse axis, means being provided for locking said auxiliary frame to said main frame against tilting under normal draft conditions, and said auxiliary frame has a portion extending rearwardly in supporting relation to said rear unit to limit the downward movement of the rear unit relative to the front unit, said locking means being releasable in response to said predetermined draft load to accommodate tilting of said auxiliary frame out of supporting relation to said rear unit.

10. The invention set forth in claim 9, wherein the implement is provided with a draft member transmitting draft between the tractor and the implement and connecting to said main frame for longitudinal movement relative thereto when an abnormal draft load is encountered by the implement.

11. The invention set forth in claim 10, wherein said draft member is operatively connected to said locking means to release the latter in response to said relative movement between said draft member and said main frame.

12. The invention set forth in claim 11, wherein a transverse wheel-carrying shaft is mounted on said main frame and is rockable to vertically move the wheels to raise and lower the implement and said auxiliary frame is pivotally mounted on the axis of said shaft.

13. The invention set forth in claim 12, wherein the wheels are vertically moved by a hydraulic cylinder anchored at one end to said auxiliary frame and at its other end to an arm secured to said shaft for rocking the arm and shaft by operation of the cylinder.

14. The invention set forth in claim 11, wherein said draft member is a rod slidably mounted on said main frame and surrounded by a spring operatively engageable with said main frame to resist movement of the rod relative to the main frame.

15. The invention set forth in claim 14, wherein said rod comprises a forward section connected to the tractor at a vertically fixed position, and rearward section operatively connected at one end to said locking means and at its other end to said forward section, and a yieldable connection is provided between said main frame and said forward section to hold said rod sections substantially in axial alignment during normal operation of the implement, said yieldable connection being yieldable to accommodate translational vertical movement of the implement relative to the tractor, whereby the implement is maintained substantially level during vertical movement thereof.

16. The invention set forth in claim 11, wherein said locking means is a toggle linkage connected between the main frame and the forward end of said auxiliary frame, and said draft member is operatively engageable with said toggle linkage to trip the latter in response to abnormal draft load on the implement.

17. In an implement adapted for connection to a tractor in draft-receiving relation including a supporting frame having a front tool-carrying unit and a rear tool-carrying unit movable upwardly relative to the front tool-carrying unit, connecting means between said units including means carried by the front tool-carrying unit engageable with said rear tool-carrying unit to cause said rear unit to rise when the front unit rises as a result of the latter encountering an obstacle imposing low draft resistance to the progress of the implement, said connecting means including means responsive to abnormal draft forces encountered by the front unit accommodating upward movement of said front unit relative to the rear unit.

References Cited

UNITED STATES PATENTS

| 1,436,391 | 11/1922 | French | 172—578 X |
| 2,704,018 | 3/1955 | Oehler et al. | 172—449 X |
| 2,765,610 | 10/7956 | Oehler et al. | 172—449 X |
| 3,190,366 | 6/1965 | Johnson et al. | 172—623 X |

FOREIGN PATENTS 784,466  5/1968  Canada.

ROBERT E. PULFREY, Primary Examiner

W. J. CONLON, Assistant Examiner

U.S. Cl. X.R.

172—623, 596, 579